United States Patent [19]

Steinbach et al.

[11] Patent Number: 5,164,351
[45] Date of Patent: Nov. 17, 1992

[54] CARRIER-SUPPORTED CATALYST FOR THE REMOVAL OF NITROGEN-OXIDES, CARBON MONOXIDE AND ORGANIC COMPOUNDS FROM EXHAUST GASES

[75] Inventors: Friedrich Steinbach, Trenknerweg 133, D-2000 Hamburg 52; Reinhild Ellmers-Kutzinski, Hamburg; Andreas Brunner, Hamburg; Holger Müller, Hamburg, all of Fed. Rep. of Germany

[73] Assignee: Friedrich Steinbach, Hamburg, Fed. Rep. of Germany

[21] Appl. No.: 526,576

[22] Filed: May 21, 1990

[30] Foreign Application Priority Data

Jun. 1, 1989 [DE] Fed. Rep. of Germany ..... 39178900

[51] Int. Cl.⁵ .......................... B01J 23/16; B01J 29/06; B01J 21/00
[52] U.S. Cl. ...................... 502/74; 502/241; 502/245; 502/248; 502/312; 502/324; 502/336; 502/354
[58] Field of Search ............... 502/241, 60, 74, 245, 502/248, 252, 312, 324, 336, 354; 423/212 C, 213.2

[56] References Cited

U.S. PATENT DOCUMENTS

| | | |
|---|---|---|
| 3,181,928 | 5/1965 | Frilette et al. .................... 423/212 C |
| 3,562,178 | 2/1971 | Hughes et al. ......................... 252/429 |
| 3,925,535 | 12/1975 | Belliot et al. ....................... 423/213.2 |
| 3,939,103 | 2/1976 | Belliot et al. ....................... 423/213.2 |
| 3,985,683 | 10/1976 | Stenzel ............................... 423/213.2 |
| 4,970,188 | 11/1990 | Steinbach et al. .................. 423/213.2 |

FOREIGN PATENT DOCUMENTS

| | | |
|---|---|---|
| 0002673 | 7/1979 | European Pat. Off. . |
| 0228398 | 7/1987 | European Pat. Off. . |
| 0289061 | 11/1988 | European Pat. Off. . |
| 0306170 | 3/1989 | European Pat. Off. . |
| 1414622 | 11/1975 | United Kingdom . |
| 8700077 | 1/1987 | World Int. Prop. O. . |

*Primary Examiner*—Carl F. Dees
*Attorney, Agent, or Firm*—Thomas N. Ljungman

[57] ABSTRACT

Carrier-supported catalyst on the basis of transition metals for the removal of nitrogen oxides, carbon monoxide and/or organic compounds from exhaust gases, which can be produced by one of: combination a), combination b), combination c) where (a) comprises charging of a carrier with at least one metal complex compound with a plane or nearly plane conformation, and activation of the charged carrier with (i) a gas mixture which contains nitrogen oxide and/or oxygen, at temperatures between room temperature and 500° C., or with (ii) a solution which contains nitric acid and/or an oxidation agent, or (b) comprises charging of a carrier with at least one transition metal oxide or transition metal carbonate, and treatment of the charged carrier with an oxidizing gas mixture, which contains free ligands capable of complex formation, at temperatures between room temperature and 500° C., or c) comprises treatment of at least one transistion metal oxide or transition metal carbonate with a solution which contains nitric acid and/or an oxidation agent, and free ligands capable of complex formation, and charging of a carrier with the treated transition metal oxide or transition metal carbonate, as well as a process for its manufacture and its use for the treatment of exhaust gases.

28 Claims, No Drawings

5,164,351

CARRIER-SUPPORTED CATALYST FOR THE REMOVAL OF NITROGEN-OXIDES, CARBON MONOXIDE AND ORGANIC COMPOUNDS FROM EXHAUST GASES

BACKGROUND OF THE INVENTION

1. Field of the Invention

This invention relates to carrier-supported catalysts on a transition metal basis for the removal of nitrogen oxides, carbon monoxide and/or organic compounds from exhaust gases, processes for their manufacture, and their use in the treatment of exhaust gases containing nitrogen oxides, carbon monoxide and/or organic compounds.

2. Background Information

It is known that a catalyst can be formed from industrial metal phthalocyanines and a carrier to remove nitrogen oxides, carbon monoxide and/or residual hydrocarbons from exhaust gases (German Laid Open Patent Application No. 35 22 637 and European Laid Open Patent Application No. 0 228 398). For this purpose, the metal phthalocyanines are treated with oxidizing gas mixtures, so that in a controlled partial decomposition of the stable complexes, assisted by the wide separation of the metal ions from one another, as a result of the structure of the complex, a highly irregular, stable and highly-active catalyst preparation is formed which differs greatly from the stoichiometric oxide and from the stoichiometric metal complex.

Several processes are disclosed for the prior fixing of the metal phthalocyanine on carriers which precedes the transformation into the active components. These include the saturation of the carrier with solutions and suspensions, the precipitation of carrier materials from metal phthalocyanine suspensions, with subsequent shaping and drying, the conversion of metal phthalocyanines into soluble derivates, to facilitate saturation, and the direct synthesis of the metal phthalocyanine from soluble preliminary stages on the carriers. If the metal phthalocyanines are to be deposited on an intermediate layer and not applied directly on the carrier, this intermediate layer can be applied not only before the application of the metal phthalocyanines, but also simultaneously with the application of the metal phthalocyanines in a single step.

OBJECT OF THE INVENTION

The purification of exhaust gases or waste gases is usually expensive, and the manufacture of the catalysts represents a significant proportion of the cost. The criteria for the beneficial, undesirable and acceptable residual levels are constantly becoming stricter, and are being extended to cover new substances. In many cases, these stricter requirements are being written into law. The economic, environmental and technical object of the invention is therefore to manufacture the catalysts more economically, in particular by employing materials and manufacturing steps with greater availability and flexibility, whose processing conditions are more flexible and whose process steps are simpler, and overall to simplify the manufacturing process. A broadening of the scope of application is also desirable. One notable use of these catalysts includes the oxidizing removal of all types of organic compounds contained in exhaust gases. Such a removal is already legally required to a great extent, and will doubtless become even more so in the future. Even after the already widespread practice of recovering these substances by condensation and sorption, there is a residual content in the exhaust which must be reduced to acceptable levels by catalytic reoxidation at the lowest possible temperature.

SUMMARY OF THE INVENTION

This object is achieved according to the invention by a carrier-supported catalyst on the basis of transition metals for the removal of compounds containing nitrogen oxides, carbon monoxide and/or organic compounds from exhaust gases, which can be manufactured by (a) charging of a carrier with at least one metal complex compound having a plane or nearly plane conformation, and activation of the charged carrier with
  (i) a gas mixture which contains nitrogen oxide and/or oxygen, at temperatures between room temperature and 500° C., or with
  (ii) a solution which contains nitric acid and/or an oxidation agent, or b) charging of a carrier with at least one transition metal oxide or transition metal carbonate, and Treatment of the charged carrier with an oxidizing gas mixture, which contains free ligands capable of complex formation, at temperatures between room temperature and 500° C., or c) treatment of at least one transition metal oxide or transition metal carbonate with a solution which contains nitric acid and/or an oxidation agent, and free ligands capable of complex formation, and charging of a carrier with the treated transition metal oxide or transition metal carbonate, with the proviso that no metal phthalocyanine complex is used as the transition metal compound.

For the catalysts according to the invention, basically the oxide, carbonate or complex compounds of all transition metals can be used. One particular advantage of the invention, however, is that it is not necessary to use those transition metals which are characterized by a high price or particular toxicity, e.g. gold, silver, platinum, chromium or nickel, although these metals can be used quite successfully. Preference is given to the use of complexes of the metals V, W, Mn, Cu, Fe, Co and Ni, whereby more than one transition metal can also be used.

The carriers used can be conventional materials of the prior art, in particular the substances and mixtures of substances disclosed and used in German Laid Open Patent Application No. 35 22 637 and European Laid Open Patent Application No. 0 228 398.

Preferred carriers are diatomaceous earth, silicon dioxide, cordierite, steatite, mullite, aluminum oxide, alumina, kaolin and perlite, feldspars, plus aluminosilicate, in particular Type A, X, Y or ZSM zeolites and natural zeolites and feldspars. Other preferred substances include graphite, magnesium silicate and magnesium oxide, zicronium silicate and zirconium oxide, titanium dioxide and silicon carbide, and metals with and without oxide coatings.

Preferably, the carrier materials used according to the invention have a microporous structure.

Carriers on a cordierite basis have been shown to be particularly advantageous, in particular cordierite honeycomb structures and aluminum oxide and zeolites. These carrier materials can also be applied on other substrates, such as metal, glass, ceramic, glass or mineral fibers.

The carrier materials are charged in the conventional manner with the oxides, carbonates or complex compounds of the transition metals. This can be done, for example, by saturating the carrier with a solution or suspension of the corresponding metal compound in water or an organic solvent, by mechanical application, mixing the pulverized materials and subsequent molding of the charged carrier, or by an application of a solution or suspension of a transition metal compound which can be decomposed into the desired transition metal oxides or carbonates, e.g. by thermal treatment in the presence or absence of oxygen.

The quantities of transition metal compound applied are generally 2 wt. % to 40 wt. %, preferably 5 wt. % to 30 wt. %, in relation to the weight of the carrier material.

One aspect of the invention resides broadly in a catalyst on a carrier support for the removal from exhaust gases of at least one of: nitrogen oxides, carbon monoxide and organic compounds, the carrier supported catalyst having been produced by the method of at least one of: step combination a, step combination b, and step combination c; the method comprising:

a)
- (a1) charging a carrier with at least one metal complex compound, the compound having one of a plane configuration and nearly plane conformation, and then
- (a2) activating the charged carrier with at least one of:
  - (i) a gas mixture which contains at least one of: nitrogen oxide and oxygen, at temperatures between room temperature and 500° C.; and
  - (ii) a solution which contains at least one of nitric acid and an oxidation agent;

b)
- (b1) charging of the carrier with at least one of: a transition metal oxide and transition metal carbonate, and
- (b2) treating the charged carrier with an oxidizing gas mixture, which contains free ligands capable of complex formation, the treating being done at temperatures between room temperature and 500° C., and c)
- (c1) treating at least one a transition metal oxide and a transition metal carbonate with a solution which contains at least one of: nitric acid, an oxidation agent, and free ligands, the free ligands being capable of complex formation; and
- (c2) charging the carrier when treated with at least one of: transition metal oxide and transition metal carbonate, and wherein the transition metal compound contains essentially no metal phthalocyanine complex.

Another aspect of the invention resides broadly in a process for the manufacture of a carrier-supported catalyst, the process comprising at least one of: step combination a, step combination b, and step combination c; the method comprising:

a)
- (a1) charging a carrier with at least one metal complex compound, the compound having one of a plane configuration and nearly plane conformation, and then
- (a2) activating the charged carrier with at least one of:
  - (i) a gas mixture which contains at least one of: nitrogen oxide and oxygen, at temperatures between room temperature and 500° C.; and
  - (ii) a solution which contains at least one of nitric acid and an oxidation agent;

b)
- (b1) charging of the carrier with at least one of: a transition metal oxide and transition metal carbonate, and
- (b2) treating the charged carrier with an oxidizing gas mixture, which contains free ligands capable of complex formation, the treating being done at temperatures between room temperature and 500° C., and c)
- (c1) treating at least one a transition metal oxide and a transition metal carbonate with a solution which contains at least one of: nitric acid, an oxidation agent, and free ligands, the free ligands being capable of complex formation; and
- (c2) charging the carrier when treated with at least one of: transition metal oxide and transition metal carbonate, and wherein the transition metal compound contains essentially no metal phthalocyanine complex, A further aspect of the invention resides broadly in a method of for removing from exhaust gases of at least one of: nitrogen oxides, carbon monoxide and organic compounds with a catalyst on a carrier support, the carrier supported catalyst having been produced by the method of at least one of: step combination a, step combination b, and step combination c; the method comprising:

a)
- (a1) charging a carrier with at least one metal complex compound, the compound having one of a plane configuration and nearly plane conformation, and then
- (a2) activating the charged carrier with at least one of:
  - (i) a gas mixture which contains at least one of: nitrogen oxide and oxygen, at temperatures between room temperature and 500° C.; and
  - (ii) a solution which contains at least one of nitric acid and an oxidation agent;

b)
- (b1) charging of the carrier with at least one of: a transition metal oxide and transition metal carbonate, and
- (b2) treating the charged carrier with an oxidizing gas mixture, which contains free ligands capable of complex formation, the treating being done at temperatures between room temperature and 500° C., and c)
- (c1) treating at least one a transition metal oxide and a transition metal carbonate with a solution which contains at least one of: nitric acid, an oxidation agent, and free ligands, the free ligands being capable of complex formation; and
- (c2) charging the carrier when treated with at least one of: transition metal oxide and transition metal carbonate, and wherein the transition metal compound contains essentially no metal phthalocyanine complex.

DESCRIPTION OF THE PREFERRED INVENTION

The carrier-supported catalysts according to the invention are suitable for the removal of nitrogen oxides, carbon monoxide and organic compounds from air and exhaust gases, e.g. from internal combustion engines, power generation plants, and in particular from installations in which organic chemicals or solvents are produced, processed or used. The catalysts according to the invention are suitable in particular for the oxidizing removal of volatile organic compounds containing oxygen and/or nitrogen. Such volatile organic compounds include alcohols, ketones, aldehydes, ethers, acids, esters, amides and amines. $NH_3$ is used for the reduction of nitrogen oxides. If the oxygen concentrations in the exhaust gas are low, CO can also be used as a reducing agent, as long as the total concentration of nitrogen oxides and oxygen is less than the CO admixture.

An additional object of the invention is a process for the manufacture of the carrier-supported catalyst by:

(a) Charging of a carrier with at least one metal complex compound with a plane or nearly plane conformation, and activation of the charged carrier with
   (i) a gas mixture which contains nitrogen oxide and/or oxygen, at temperatures between room temperature and 500° C., or with
   (ii) a solution which contains nitric acid and/or an oxidation agent, or b) Charging of a carrier with at least one transition metal oxide or transition metal carbonate, and Treatment of the charged carrier with an oxidizing gas mixture, which contains free ligands capable of complex formation, at temperatures between room temperature and 500° C., or c) Treatment of at least one transition metal oxide or transition metal carbonate with a solution which contains nitric acid and/or an oxidation agent, and free ligands capable of complex formation and Charging of a carrier with the treated transition metal oxide or transition metal carbonate.

Of particularly favorable effect for a high activity of the catalysts used according to the invention are intermediate layers of oxides of one or more transition metals, generally called "washcoats", which is less a stratified structure than an intimate mixture of the washcoat and the catalytic substance. The intermediate layers or transition metal oxides must therefore be applied before or together with the transition metal complex compounds on the carrier or in it. The application of the washcoat is performed in the manner described above. The amount of transition metal oxide is generally 0.5 wt. % to 30 wt. %, preferably 2 wt. % to 25 wt. %, in addition to the amount of the complex compound.

The transition metal of the oxide intermediate layer can be the same as or different from that of the activated complex components.

The uniform distribution both of the applied catalyst precursors and also of the catalysts produced from them in carrier volumes with completely impregnated carriers or in a layer close to the surface for incompletely impregnated carriers can be detected by infrared spectroscopic examination of fractures, sections and slides. By means of the intimate mixture of catalysts and carriers achieved with the above-mentioned preparation methods, the catalysts are resistant to being carried off by the high gas current even at very high space velocities (SV) of up to $10^6$ $h^{-1}$. In completely impregnated carriers, moreover, when the surface is worn away by the dust in the exhaust gas, the continuously regenerated surface always provides an activated catalyst.

As with the metal phthalocyanines, with the complexes used according to the invention which are plane or nearly so, there is an interaction with transition metal oxides, such that the temperatures of the oxidizing partial decomposition by oxidizing or nitrating gases and vapors in the presence of intimitately mixed transition metal oxides are significantly lower than the known stability limits of the compounds in question, without contact with transition metal oxides, in oxidizing atmospheres.

It is known that metal oxides and mixtures of metal oxides can be used in various ways for catalytic reactions with NO and also for oxidations. Careful examination in terms of activity and conversion, in particular by examining the characteristic conversion as a function of the temperature, showed that the catalysts according to the invention produced by the joint application of metal oxide and metal complex on or in carriers differ from preparations in which only the metal oxide has been applied or added. This examination is particularly persuasive if only the transition metal oxide is added, its activity is tested, and then the metal complex is added to it and modified. There are significant differences in the conversion characteristics compared to carriers charged only with oxide, in particular in the lower temperature range below 250° C. use. This testing is particularly significant with the preparations on which the complexing components are not introduced as a ligand of the complex used for the preparation, but as gaseous components with the modification gas. Here, ligands from the gas phase enter into interaction with previously-applied oxides or carbonates, so that the complexes on the surface are partly decomposed immediately by oxidation or nitration, such that the oxides or carbonates etc. applied are transformed into active catalysts. Here, too, the tests of the conversion characteristics show pronounced activity differences, and in particular activity after the modification reaction at significantly lower temperatures, frequently accompanied by a drastic change in selectivity.

The major surface differences between the active catalyst preparations used according to the inventions and the oxides are also apparent in scanning electron microscope photographs of the surfaces. Photoelectron spectroscopy examinations show that even after the decomposition of the complexes by nitrating or oxidizing treatment, ingredients of the organic components are still contained in the active surfaces.

Since the classes of the plane and almost plane complexes used according to the invention are significantly broader than the class of the metal phthalocyanines, and in particular since many of the usable complexes are smaller and/or have or are more strongly polar groups, fewer requirements are set for the solvents required for solutions and suspensions. The solubility is generally significantly higher than with the phthalocyanines. In particular, aqueous solutions and mixtures can often be used, so that the manufacture of the catalysts according to the invention is simpler and more economical.

According to the invention, as a result of the ligands contributed or as a result of ligands temporarily absorbed from the gas chamber, there occur loosenings of structures and enlargements of the surface. Simultaneously, for stabilization, direct contact must be possible between the metal atoms with the substrate formed by the carrier and/or washcoat. Therefore, non metal-organic compounds or complexes are unsuitable, and only plane or nearly plane complexes are suitable. Since the formation of a regular and closed oxide structure in each case represents a competing possibility, the optimal configuration of the production principle is a function both of the central metal used and also of the stability and structure of its oxide. Therefore, both the decomposition of a plane complex and the action of a gas mixture containing complex-forming agents on an oxide or carbonate can lead to greater effectiveness. Frequently, it is favorable to take advantage of several of these possibilities simultaneously. Thus, for example, by the use of an oxidic washcoat on which the complex is applied, the temperature for its decomposition can be reduced and the decomposition can thus be delayed, whereby a gas mixture containing complex-forming agents present during the decomposition prevents the competing formation of a smooth surface.

Since gaseous products are formed during the decomposition of the complex structure, it is essential that the modification gas keeps flowing, so that the reaction products are constantly removed, and the interaction process between the gas atmosphere and surface is not disrupted by a slowdown of the reaction and depletion of complex-forming agents in the immediate vicinity of the surface. This leads to sharp reductions of activity. Complexing components are NO, CO, $NH_3$, to mention only the most important and industrially acceptable. Ethylene, ethylene diamine or hydrazine are additional examples.

All plane complexes are suitable as complexes, because on one hand, they make possible the contact required for the binding to the substrate, and on the other hand they largely prevent an latching of the metals in the oxide layers on account of the misfit produced by the flat spreading.

Preference is given to the use of compounds of the metals V, W, Mn, Cu, Fe, Co and Ni. More than one transition metal can also be used.

Complexes which are particularly useful include vanadyl oxalate, vanadyl acetylacetonate, vanadyl salicylate, vanadyl tartrate, vanadyl catechol, as well as manganese oxalate, manganese acetylacetonate, manganese salicylate, manganese acetate, manganese propionate, and iron oxalate, iron phthalate, iron acetylacetonate, iron succinate, iron tetraphenylporphyrine, iron porphyrine, and cobalt phthalate, cobalt diacetyldioxime, cobalt tetraphenylporphyrine, cobalt tetraazaannulene, cobalt acetate, and nickel diacetyldioxime, nickel tetraphenylporphyrine, nickel acetate, and copper acetate, copper oxalate, copper acetylacetonate and copper phthalate.

Overall, complexes are suitable which contain the ligands acetic acid, oxalic acid, tartaric acid, salicylic acid, and additional low carbonic acids, dicarbonic acids and hydroxycarbonic acids, in particular with 2 to 10 carbon atoms, 1,3-diketones, substituted and unsubstituted aromatic ortho-carboxylbenzoic acids, substituted and unsubstituted aromatic mono-ortho-hydroxycarbonic acids, substituted and unsubstituted ortho-hydroxyphenols, substituted and unsubstituted tetraazaporphyrine, substituted and unsubstituted tetraazaannulene, substituted and unsubstituted porphyrine, substituted and unsubstituted hemiporphyrazine, substituted and unsubstituted bis-1,2-dioxime, substituted and unsubstituted tetraazacyclododecantetra acetic acid, as well as crown ethers (Kronether).

The activation of the carrier charged with at least one metal complex compound can be accomplished by means of a gas mixture which contains nitrogen oxide and/or oxygen. As a rule, an inert gas is used, e.g. nitrogen or argon, to which a certain quantity of nitrogen and/or oxygen is added. The nitrogen oxide can be both NO and $NO_2$, whereby NO is preferred. Other possible components of the activation gas mixture are CO and $NH_3$. The charged carrier is activated at a temperature between room temperature and 500° C. Generally, for this purpose, the charged carrier is heated in the activation gas mixture from room temperature to a temperature between 80° and 500° C., preferably between 180° C. and 450° C., over a period of 1 hour to 10 hours, and is held at the final temperature as appropriate for up to 10 hours.

The activation gas mixture contains the activating components, generally in quantities from 250 ppm to 5%, in relation to the volume. The oxygen content is preferably 0.1 vol. % to 25 vol. %, and the concentration of NO and any other gases which may be present is 500 ppm to 5000 ppm. Particularly preferable is a concentration of approximately 1000 ppm each of NO, CO and $NH_3$, and approximately 1% to 2% $O_2$. The activation can also be done using air.

As an alternative to the activation with a gas mixture at elevated temperatures, the carrier can also be charged with a solution which contains nitric acid and/or an oxidation agent. The solvent used is preferably water or an aqueous organic solution which is inert in relation to nitric acid. The concentration of nitric acid is generally between 1 wt. % and 20 wt. %, and the concentration of oxidation agent is generally between 2 wt. % and 20 wt. %. Other oxidation agents used can be nitrous acid as well as nitrating acids and solutions of nitrogen oxides.

The activation is preferably conducted in the presence of heat, e.g. at temperatures between 20° C. and 50° C.

Alternatively, the carrier-supported catalyst according to the invention can also be obtained by the activation of a carrier charged with at least one transition metal oxide or transition metal carbonate. In that case, the activation is accomplished with the above-mentioned activation gas mixture, to which however a gaseous free ligand capable of complex formation must be added. Such gaseous free ligands forming complexes are in particular NO, $NH_3$ and CO in the quantities indicated above. Additional ligands which can be used for complexing are ethylene, ethylene diamine or hydrazine. It is essential that the ligands for the formation of complexes are able to prevent the formation of a regular, not-very-reactive oxide layer on and in the carrier.

According to one variant of the manufacturing process, the transition metal oxide or transition metal carbonate layer is produced on the carrier itself. In this case, the carrier is impregnated with a compound of the desired transition metal which is dissolved or suspended in a medium, and is then subjected to a treatment in which the transition metal compound applied is decomposed to the oxide or carbonate. Preferably, this decomposition takes place thermally, by heating in the presence of oxygen or air.

The activation of the transition metal complex compound can also take place before the charging of the carrier in solution, whereby the above-mentioned nitric acid or oxidation agent solution is used. The invention is described in greater detail by the following examples.

EXAMPLES

The invention is explained in greater detail by the following examples. In the examples, the manufacture of the catalysts on the carriers is first described. To the extent that it applies only to the application by saturation of the carrier by means of solutions or suspensions, only the composition of the saturation solution or saturation suspension is indicated. The carrier bodies used are primarily cordierite honeycomb structures, as a rule with a cross section of $2.5 \times 2.5$ cm$^2$ and 5 cm or 10 cm long, with 16 channels on the cross section indicated above. The saturation is performed several times, until the specified charge is reached. The carriers are dried between the saturations, preferably at 110° C. to 120° C. For the activation, a gas mixture is used, the composition of which is specified. Following the description of the manufacture and activation, the activities, i.e. the conversion rates which are achieved in various catalytic purification processes, are indicated in table form.

EXAMPLE 1

Manganese acetylacetonate, Mn(acac)$_2$

Saturation solution: 102 g Mn(acac)$_2$ in 180 ml water and 20 ml formic acid.
Carrier: Cordierite honeycomb structure
Charging by successive saturations at room temperature, followed by drying and repeated saturation and drying, until a charge of 12 wt. % Mn(acac)$_2$ is achieved.
Activation in gas mixture of 1000 ppm each NO, NH$_3$, 1% O$_2$, rest N$_2$ with space velocity SV=3000 h$^{-1}$, increasing over 5 hours from room temperature to 200° C.

| Activity: Reaction | Conversion (%) | Temp. °C. | Test Gas SV = 3000 h$^{-1}$ |
|---|---|---|---|
| Ethanol oxidation | 89 | 294 | 1800 ppm ethanol in air |
| Acetone oxidation | 91 | 270 | 2000 ppm acetone in air |
| Ethylacetate oxidation | 93 | 309 | 500 ppm ethylacetate in air |
| Ether oxidation | 88 | 360 | 1500 ppm ether in air |
| Benzol oxidation | 97 | 355 | 300 ppm benzol in air |
| Benzylamine oxidation | 83 | 302 | 1100 ppm benzylamine in air |
| Aniline oxidation | 93 | 305 | 1200 ppm aniline in air. |
| Propane oxidation | 92 | 375 | 1000 ppm propane in air |
| CO oxidation | 95 | 160 | 1100 ppm CO, 2500 ppm O$_2$, rest N$_2$ |

Identical preparations were activated, instead of with the gas mixture indicated above, with mixtures of 1000 ppm each NO, CO, NH$_3$, 0.5% O$_2$, rest N$_2$, and from 1000 ppm NO, 3000 ppm CO, rest N$_2$, and from 2000 ppm CO, 1000 ppm NH$_3$, 0.5% O$_2$. The conversions obtained are essentially the same as those indicated in the table.

EXAMPLE 2

Manganese acetylacetonate on manganese oxide/copper oxide washcoat Saturation solutions
1. 125 g manganese acetate Mn (CH$_3$COO)$_2 \times$4 H$_2$O in 500 ml water.
2. 12 g copper nitrate Cu(NO$_3$)$_2 \times$3 H$_2$O in 500 ml water.
3. 102 g Mn(acac)$_2$ in 180 ml water and 20 ml formic acid.
Carrier: Cordierite honeycomb structure
Charging by repeated saturation at room temperature, with intermediate dryings.
1. 15 wt. % manganese acetate
2. 1.5 wt. % copper nitrate
3. 12 wt. % manganese acetylacetonate.
Activation in gas mixture of 1000 ppm each NO and NH$_3$, 1% O$_2$, rest N$_2$ at space velocity SV=3000 h$^{-1}$ increasing over 5 hours from room temperature to 200° C.

| Activity: Reaction | Conversion (%) | Temp. °C. | Test Gas SV = 3000 h$^{-1}$ |
|---|---|---|---|
| NO reduction | 89 | 170 | 1000 ppm each NO, NH$_3$, 1% O$_2$, rest N$_2$ |
| NO reduction | 86 | 185 | 1000 ppm NO, 3000 ppm CO, 500 to 1000 ppm O$_2$, rest N$_2$ |
| Ethanol oxidation | 91 | 243 | 1800 ppm ethanol in air |
| Acetone oxidation | 89 | 235 | 2000 ppm acetone in air |
| Ethylacetate oxidation | 90 | 245 | 500 ppm ethylacetate in air |
| Ether oxidation | 90 | 260 | 1500 ppm ether in air |
| Benzol oxidation | 96 | 297 | 300 ppm benzol in air |
| Benzylamine oxidation | 83 | 253 | 1100 ppm benzylamine in air |
| Aniline oxidation | 89 | 305 | 1200 ppm aniline in air. |
| Propane oxidation | 92 | 342 | 1000 ppm propane in air |
| CO oxidation | 98 | 155 | 1100 ppm CO, 2500 ppm O$_2$, rest N$_2$ |

EXAMPLE 3

Manganese acetate (Mn(CH$_3$COO)$_2 \times$4 H$_2$O Saturation solution: 123 g Manganese acetate in 500 ml water.
Carrier: Cordierite honeycomb structure
Charging by successive saturations at room temperature, until a charge of 15 wt. % manganese acetate is achieved.
Activation in gas mixture of 1000 ppm each NO, NH$_3$, 1% O$_2$, rest N$_2$ with space velocity SV=3000 h$^{-1}$, increasing over 5 hours from room temperature to 200° C.

| Activity: Reaction | Conversion (%) | Temp. °C. | Test Gas SV = 3000 h$^{-1}$ |
|---|---|---|---|
| Ethanol oxidation | 89 | 294 | 1800 ppm ethanol in air |
| Acetone oxidation | 91 | 270 | 2000 ppm acetone in air |
| Ethylacetate oxidation | 93 | 309 | 500 ppm ethylacetate in air |
| Ether oxidation | 88 | 360 | 1500 ppm ether in air |
| Benzol oxidation | 97 | 355 | 300 ppm benzol in air |
| Benzylamine oxidation | 83 | 302 | 1100 ppm benzylamine in air |
| Aniline oxidation | 93 | 305 | 1200 ppm aniline in air |
| Propane oxidation | 92 | 375 | 1000 ppm propane in air |
| CO oxidation | 98 | 160 | 1100 ppm CO, 2500 ppm O$_2$, rest N$_2$ |

The same preparation was tested on Al$_2$O$_3$ minimonoliths (wagon wheels) as carriers. The activity test was performed with a fluidized bed having a total volume of 30 ml, with the same test gas compositions. Within the measurement precision, the same conversions were measured at the same temperatures.

COMPARATIVE EXAMPLE 1

Manganese Formate

Manganese formate $Mn(HCOO)_2$ can serve as a comparative example. From a preferable saturation solution of 50 g $MnCo_3 \times H_2O$ in 500 ml formic acid, a charge of 15 wt. % manganese formate is produced by soaking preferably to saturation at room temperature. By treatment in air, increasing the temperature over 5 hours from room temperature to 200° C., the transition to the "active" components is made. In the same test gas as in Example 2, the NO reduction is tested. There is a conversion maximum of 95% at 240° C. Not only is the temperature of the conversion maximum significantly higher than with the catalyst described in Example 2, but NO is almost exclusively converted to $N_2O$ instead of to $N_2$. A treatment with the gas mixture used in Example 2 for activation here does not lead to a change in the activity or selectivity.

Apparently, formate as a ligand is too little spread out to give rise during the activation to a structure other than the conventional manganese oxide, with the activity known for manganese oxide, which leads almost exclusively to the formation of $N_2O$.

EXAMPLE 4

Copper acetylacetonate on manganese oxide/copper oxide washcoat Saturation solutions 1. 125 g manganese acetate $Mn(CH_3COO)_2 \times 4\ H_2O$ in 500 ml water.
2. 12 g copper nitrate $Cu(NO_3)_2 \times 3\ H_2O$ in 500 ml water.
3. 52 g $Cu(acac)_2$ in 180 ml water and 20 ml formic acid.

Carrier: Cordierite honeycomb structure

Charging by repeated saturation at room temperature with the individual saturation solutions in the indicated order, until the following charges are achieved:

1. 15 wt. % manganese acetate
2. 1.5 wt. % copper nitrate
3. 7.6 wt. % copper acetylacetonate.

Activation in gas mixture of 1000 ppm each NO and $NH_3$, 1% $O_2$, rest $N_2$ at space velocity $SV=3000\ h^{-1}$ increasing over 5 hours from room temperature to 320° C.

| Activity: Reaction | Conversion (%) | Temp. °C. | Test Gas SV = 3000 h$^{-1}$ |
|---|---|---|---|
| NO reduction | 92 | 180 | 1000 ppm each NO, NH$_3$, 1% O$_2$, rest N$_2$ |
| NO reduction | 90 | 186 | 1000 ppm NO, 3000 ppm CO, 500 to 1000 ppm O$_2$, rest N$_2$ |
| Ethanol oxidation | 95 | 210 | 1800 ppm ethanol in air |
| Acetone oxidation | 90 | 220 | 2000 ppm acetone in air |
| Ethylacetate oxidation | 98 | 215 | 500 ppm ethylacetate in air |
| Ether oxidation | 95 | 240 | 1500 ppm ether in air |
| Benzol oxidation | 95 | 290 | 300 ppm benzol in air |
| Benzylamine oxidation | 90 | 245 | 1100 ppm benzylamine in air |
| Aniline oxidation | 92 | 246 | 1200 ppm aniline in air |
| Propane oxidation | 95 | 320 | 1000 ppm propane in air |
| CO oxidation | 100 | 108 | 1100 ppm CO, 2500 ppm O$_2$, rest N$_2$ |

The catalyst was tested over 1000 hours. There was no decrease in activity.

The same preparation was tested on aluminum oxide pellets as carriers. The activation also took place in the same manner, but with a volume speed of $SV=500\ h^{-1}$. The activity test was performed with a fluidized bed of 30 ml total volume, with the same test gas, but on account of the higher flow resistance of the fluidized bed, with a space velocity of only $SV=1000\ h^{-1}$.

| Activity: Reaction | Conversion (%) | Temp. °C. | Test Gas SV = 3000 h$^{-1}$ |
|---|---|---|---|
| NO reduction | 92 | 165 | 1000 ppm each NO, NH$_3$, 1% O$_2$, rest N$_2$ |
| Ethanol oxidation | 95 | 190 | 1800 ppm ethanol in air |
| Acetone oxidation | 90 | 210 | 2000 ppm acetone in air |
| Ethylacetate oxidation | 98 | 200 | 500 ppm ethylacetate in air |
| Ether oxidation | 95 | 220 | 1500 ppm ether in air |
| Benzol oxidation | 95 | 278 | 300 ppm benzol in air |
| Benzylamine oxidation | 90 | 235 | 1100 ppm benzylamine in air |
| Aniline oxidation | 92 | 230 | 1200 ppm aniline in air. |
| Propane oxidation | 95 | 305 | 1000 ppm propane in air |
| CO oxidation | 100 | 90 | 1100 ppm CO, 2500 ppm O$_2$, rest N$_2$ |

EXAMPLE 5

Copper acetylacetonate on copper oxide washcoat Saturation solutions 1. 12 g copper nitrate $Cu(NO_3)_2 \times 3\ H_2O$ in 500 ml water
2. 52 g $Cu(acac)_2$ in 180 ml water and 20 ml formic acid Carrier: Cordierite honeycomb structure Charging by saturation at room temperature to 1. 14.2 wt. % copper nitrate
2. 7.6 wt. % copper acetylacetonate Activation as in Example 4.

| Activity: Reaction | Conversion (%) | Temp. °C. | Test Gas SV = 3000 h$^{-1}$ |
|---|---|---|---|
| NO reduction | 85 | 245 | 1000 ppm each NO, NH$_3$, 1% O$_2$, rest N$_2$ |

COMPARATIVE EXAMPLE 2

Copper formate on copper oxide washcoat

Here again, the copper formate preparation is used as the less active comparative example. From copper formate in aqueous solution, or also by the action of formic acid on a copper oxide produced from copper nitrate on the carrier, a charge with copper formate is produced which is treated with air, increasing over 5 hours from room temperature to 320° C. This preparation, with the same test gas as in the Examples 4 and 5, has a maximum conversion for NO of 50% at 300° C. The activity is only insignificantly increased by treatment with a gas mixture as in Example 4 and 5.

EXAMPLE 6

Vanadyl acetylacetonate on vanadium oxide washcoat Saturation solutions 1. 70 g bis-oxalato-oxovanadate (IV), $VO(Hc_2O_4)_2$, produced from 18 g vanadium oxide, $V_2O_5$, and 50 g oxalic acid, together with 2 g sodium tungstenate, $Na_2WO_4 \times 2H_2O$, each 100 ml water;

2. 20 g vanadyl acetylacetonate, VO(acac)$_2$, per 100 ml chloroform or 100 ml mixture of formic acid and water in the ratio 1:10.

Carrier: Cordierite honeycomb structure

Charging by repeated saturation at room temperature up to the desired charges:

1. 26 wt. % bis-oxalato-vanadate(IV) and sodium tungstenate in the ratio 9:1, which corresponds to a charge with 15 wt. % V$_2$O$_5$+Na$_2$WO$_4$ 2. 7 wt. % VO(acac)$_2$.

Activation in gas mixture of 1000 ppm each NO and NH$_3$, 1% O$_2$, rest N$_2$, with space velocity SV=3000 h$^{-1}$, increasing over 10 hours from room temperature to 450° C. and held for 8 hours at 450° C.

| Activity: Reaction | Conversion (%) | Temp. °C. | Test Gas SV = 3000 h$^{-1}$ |
| --- | --- | --- | --- |
| NO reduction | 97 | 285 | 1000 ppm each NO, NH$_3$, 1% O$_2$, rest N$_2$ |
|  | 90 | 235–340 |  |
|  | 80 | 205–370 |  |

The same preparation was tested on Al$_2$O$_3$ minimonoliths (wagon wheels) as carriers. The activity test was performed with a fluidized bed having a total volume of 30 ml, with the same test gas compositions. Within the measurement precision, the same conversions were measured at the same temperatures as above for a cordierite honeycomb structure.

EXAMPLE 7

Bis-oxalate-oxovanadate(IV) VO(HC$_2$O$_4$)$_2$

Saturation solution: Same as Solution 1 in Example 6

Carrier: Cordierite honeycomb structure

Charging by saturation at room temperature until the desired charge is reached: 24 wt. % oxalate complex and sodium tungstenate in the ratio 9:1, which corresponds to 12.5 wt. % V$_2$O$_5$—Na$_2$WO$_4$.

Activation as in Example 6.

| Activity: Reaction | Conversion (%) | Temp. °C. | Test Gas SV = 3000 h$^{-1}$ |
| --- | --- | --- | --- |
| NO reduction | 88 | 280 | 1000 ppm each NO, NH$_3$, 1% O$_2$, rest N$_2$ |
|  | 90 | 235–345 |  |

The catalyst was tested over 800 hours without a decrease in activity.

The same preparation was tested on Al$_2$O$_3$ pellets as carriers. The activation also took place in the same manner, but with a space velocity of SV=1500 h$^{-1}$. The activity test was performed with a fluidized bed of 30 ml total volume, with the same test gas, but on account of the higher flow resistance of the fluidized bed, with a volume speed of only SV=1000 h$^{-1}$. The catalyst had a conversion maximum of 90% NO reduction at 250° C.

The same preparation was also tested on aluminum corrugated sheet rollers as carriers coated with aluminum oxide up to a charge with 8 wt. % V$_2$O$_5$—Na$_2$WO$_4$. The activation was conducted as above with a space velocity SV=3000 h$^{-1}$. A corrugated sheet roller 3 cm in diameter and 5 cm long was used as the test body, with the above-mentioned test gas compositions and SV=3000 h$^{-1}$ volume speed. There was a maximum NO conversion of 82% at 290° C.

Examples 6 and 7 show the described effect of the geometry of the plane or almost plane ligands of the metal, here of the vanadyl VO, for the catalytically favorable arrangement of the oxidation products produced from the complexes. The activity of the catalyst described in Example 6 is practically the same as that achieved using vanadyl phthalocyanine, VOPc, at the same charge and with the same activation treatment.

Comparative Example 3

Vanadium oxide

The preparation of vanadium oxide V$_2$O$_5$ from ammonium vanadate NH$_4$VO$_3$ can be used as a comparative example. From 20 g of ammonium vanadate in 100 ml of boiling water, a suspension is produced with which a carrier structure is saturated under continuous reboiling, until a charge of 16 wt. % ammonium vanadate is achieved. By thermal treatment in air—increasing in 12 hours from room temperature to 450xC. and then held at 450° C. for 8 hours—the charge is produced with 13 wt. % V$_2$O$_5$. The preparations produced in this manner show results in activity tests which are similar to those in Example 6 or 7, i.e. a conversion maximum of 50% for NO at temperatures between 330° and 340° C.

EXAMPLE 8

Hemin on iron oxide washcoat

Saturation solutions:

1. 80 g iron nitrate FE(NO$_3$)$_3$×9H$_2$O in 200 ml water
2. 10 g hemin in 100 ml formic acid Carrier: Cordierite honeycomb structure Charging at room temperature by repeated saturations.

1. 6.3 wt. % iron nitrate
2. 7.1 wt. % hemin.

Activation by treatment in gas mixture consisting of 1000 ppm each NO and NH$_3$, 1% O$_2$, rest N$_2$, with space velocity SV=3000 h$^{-1}$, increasing over 5 hours from room temperature to 340° C.

| Activity: Reaction | Conversion (%) | Temp. °C. | Test Gas SV = 3000 h$^{-1}$ |
| --- | --- | --- | --- |
| NO reduction | 87 | 320 | 1000 ppm each NO, NH$_3$, 1% O$_2$, rest N$_2$ |
|  | 80 | 300–350 |  |

EXAMPLE 9

Nickel dimethyl glyoxime on nickel oxide washcoat

Saturation solutions 1. 175 g nickel nitrate Ni (NO$_3$)$_2$×6H$_2$O in 300 ml water
2. 10 g dimethyl glyoxime in 200 ml ethanol Carrier: Cordierite honeycomb structure Saturation with nickel nitrate up to a charge of 18 wt. %, followed by synthesis of the nickel dimethyl glyoxime on and in the carrier by on-site precipitation by two saturations, each for 1 minute, in solution 2, at room temperature. Activation by treatment in gas mixture consisting of 1000 ppm each NO and NH$_3$, 1% O$_2$, rest N$_2$, with SV=3000 h$^{-1}$, increasing over 5 hours from room temperature to 320° C.

| Activity: Reaction | Conversion (%) | Temp. °C. | Test Gas SV = 3000 h$^{-1}$ |
|---|---|---|---|
| NO reduction | 55 | 250 | 1000 ppm each NO, NH$_3$, 1% O$_2$, rest N$_2$ |

The same preparation was tested by on-site synthesis in nickel-substituted NaY-zeolite pellets with ethanol dimethyl glyoxime solution. The ion exchange was accomplished by two treatments, each over 24 hours, with a 0.025 molar nickel acetate solution. The nickel-substituted zeolite was treated with Solution 2 and the nickel dimethyl glyoxium produced in the zeolite was converted by activating treatment with the above-mentioned gas mixture at SV=500 h$^{-1}$ into the active catalyst. The activity test took place with a granular fluidized bed of 30 ml total volume at SV=800 h$^{-1}$. The conversion maximum of the NO reduction was determined with an 80% conversion at 230° C.

EXAMPLE 10

Manganese carbonate

Saturation solution: Suspension of 50 g MnCO$_3$×H$_2$O in 500 ml water and 5 ml nitric acid.

Carrier: Cordierite honeycomb structure

Repeated saturation up to a charge of 5 wt. % manganese carbonate. Activation by treatment in gas mixture consisting of 1000 ppm each NO and NH$_3$, 1% O$_2$, rest N$_2$, with space velocity SV=3000 h$^{-1}$, increasing over 5 hours from room temperature to 270° C.

| Activity: Reaction | Conversion (%) | Temp. °C. | Test Gas SV = 3000 h$^{-1}$ |
|---|---|---|---|
| NO reduction | 95 | 140 | 1000 ppm each NO, NH$_3$, 1% O$_2$. rest N$_2$ |
|  | 85 | 97 | 1000 ppm NO, 900 ppm NH$_3$, 6% O$_2$, rest N$_2$ |
| Ethanol oxidation | 91 | 294 | 1800 ppm ethanol in air |
| Acetone oxidation | 87 | 273 | 2000 ppm acetone in air |
| Ethylacetate oxidation | 93 | 305 | 500 ppm ethylacetate in air |
| Ether oxidation | 83 | 350 | 1500 ppm ether in air[2] |
| Benzol oxidation | 92 | 354 | 300 ppm benzol in air |
| Benzylamine oxidation | 88 | 302 | 1100 ppm benzylamine in air |
| Aniline oxidation | 93 | 305 | 1200 ppm aniline in air. |
| Propane oxidation | 97 | 373 | 1000 ppm propane in air |
| CO oxidation | 98 | 165 | 1100 ppm CO, 2500 ppm O$_2$, rest N$_2$ |

The catalyst was tested over 300 hours without a reduction in activity.

EXAMPLE 11

Iron oxide Saturation solution: 80 g Fe(NO$_3$)$_3$×9H$_2$O in 200 ml water

Carrier: Cordierite honeycomb structure

Charging by multiple saturations up to 6.3 wt. % iron nitrate.

Activation by treatment in a gas mixture consisting of 1000 ppm each NO and NH$_3$, 1% O$_2$, rest N$_2$, with space velocity SV=3000 h$^{-1}$, increasing over 5 hours to 340° C.

| Activity Reaction | Conversion (%) | Temp. °C. | Test Gas SV = 3000 h$^{-1}$ |
|---|---|---|---|
| NO reduction | 83 | 300 | 1000 ppm each NO, NH$_3$, 1% to 3% O$_2$, rest N$_2$ |

Examples 10 and 11 show how highly-active surfaces are formed as a result of the action of flowing oxidizing gases which contain complex-forming ingredients, here NO and NH$_3$, at moderate temperatures and with sufficiently long exposure, from the applied or precipitated oxides or carbonates, by a modification of the structure and geometry.

Comparative Example 4

Iron Oxide

Iron oxide without this activation by complex forming substances can be used as a comparative example. An iron nitrate charge was produced in the same manner as in Example 11, but not converted and activated into oxide, as above, in the presence of a flowing gas mixture containing components into ligands. Instead, it was converted in air into oxide according to the same temperature program, and shows only a conversion maximum of 50% at 325° C.

Comparative Example 5

Manganese Oxide

Manganese oxide is described as an additional comparative example.

Saturation solution: 50 g MnCO$_3$×H$_2$O in 500 ml diluted nitric acid: the suspension is heated for 30 minutes to 100° C., to produce the manganese (II) nitrate. A solution of 70 g Mn(NO$_3$)$_2$×6H$_2$O in 500 ml water can also be used.

Carrier: Cordierite honeycomb structure

Multiple saturation at room temperature up to a charge of 12 wt. % MnO$_2$.

Activation by treatment in air, increasing in 5 hours to 200° C.

| Activity Reaction | Conversion (%) | Temp. °C. | Test Gas SV = 3000 h$^{-1}$ |
|---|---|---|---|
| NO reduction | 95 | 195 | 1000 ppm each NO, NH$_3$, 1% to 4% O$_2$, rest N$_2$ |

The temperature of the conversion maximum is higher by 55° C. than in Example 10. Of even more significance is the fact that here, as with manganese oxide, the reaction leads primarily to the formation of N$_2$O instead of to N$_2$, while on the catalyst described in Example 10, this takes place only to a secondary extent, as required of good denox catalysts.

Comparative Example 6

Manganese Oxide

Manganese oxide obtained from manganese formate by treatment in air, increasing over 5 hours from room temperature to 200° C., can be used as another comparative example. The conversion maximum of the NO reduction is at 240° C., which is 100° C. higher than in Example 10, and the converted NO is almost exclusively converted to NH$_2$O.

EXAMPLE 12

Vanadium Oxide Saturation Solution: Suspension of 20 g ammonium vanadate, $NH_4VO_3$ per 100 ml of boiling water.

Carrier: Cordierite honeycomb structure

Charging by saturation in the boiling suspension up to the value of 16 wt. % $NH_4VO_3$, which corresponds to 13 wt. % $V_2O_5$.

If the charge produced in this manner is "activated" with air by heating over 12 hours to 450° C., and holding at this temperature for 8 hours, then a not-very-active substance is obtained: Conversion maximum at maximum 50% at 330° to 340° C. After activation with a gas mixture containing complex ligand, the result is a preparation of significantly higher activity and an activity maximum at temperatures approximately 40° C. lower. Activation by treatment in the gas mixture of 1000 ppm each NO, $NH_3$, 1 to 4% $O_2$, rest $N_2$, with space velocity SV=3000 $h^{-1}$, with temperature increasing within 12 hours to 450° C., and holding at 450° C. for 8 hours.

| Activity Reaction | Conversion (%) | Temp. °C. | Test Gas SV = 3000 $h^{-1}$ |
|---|---|---|---|
| NO reduction | 70 | 290–300 | 1000 ppm each NO, $NH_3$, 1% to 4% $O_2$, rest $N_2$ |

In summary one feature of the invention resides broadly in a carrier-supported catalyst on the basis of transition metals for the removal of nitrogen oxides, carbon monoxide and/or organic compounds from exhaust gases, which can be produced by (a) Charging of a carrier with at least one metal complex compound with a plane or nearly plane conformation, and activation of the charged carrier with
  (i) a gas mixture which contains nitrogen oxide and/or oxygen, at temperatures between room temperature and 500° C., or with
  (ii) a solution which contains nitric acid and/or an oxidation agent, or
b) Charging of a carrier with at least one transition metal oxide or transition metal carbonate, and Treatment of the charged carrier with an oxidizing gas mixture, which contains free ligands capable of complex formation, at temperatures between room temperature and 500° C., or
c) Treatment of at least one transition metal oxide or transition metal carbonate with a solution which contains nitric acid and/or an oxidation agent, and free ligands capable of complex formation and charging of a carrier with the treated transition metal oxide or transition metal carbonate, with the proviso that no metal phthalocyanine complex is used as the transition metal compound.

Another feature of the invention resides broadly in a catalyst which is characterized by the fact that in the manufacturing variant (a), the carrier is also charged before the activation with at least one transition metal oxide.

Yet another feature of the invention resides broadly in a catalyst which is characterized by the fact that at least one of the group consisting of V, Cr, Mo, W, Mn, Fe, Co, Ni or Cu is used as the transition metal.

A further feature of the invention resides broadly in a catalyst which is characterized by the fact that aluminum oxide, silicon dioxide, silicate, zeolite or aluminium silicate is used as the carrier material.

A yet further feature of the invention resides broadly in a catalyst which is characterized by the fact that a cordierite or mullite honeycomb structure is used as the carrier.

Yet another further feature of the invention resides broadly in a process for the manufacture of the carrier-supported catalyst.

a) Charging a carrier with at least one metal complex compound having a plane or nearly plane conformation, and Activation of the charged carrier with
  (i) a gas mixture which contains nitrogen oxide and/or oxygen, at temperatures between room temperature and 500° C., or with
  (ii) a solution which contains nitric acid and/or an oxidation agent, or
b) Charging of a carrier with at least one transition metal oxide or transition metal carbonate, and Treatment of the charged carrier with an oxidizing gas mixture, which contains free ligands capable of complex formation, at temperatures between room temperature and 500° C., or
c) Treatment of at least one transition metal oxide or transition metal carbonate with a solution which contains nitric acid and/or an oxidation agent, and free ligands capable of complex formation, and Charging of a carrier with the treated transition metal oxide or transition metal carbonate.

An additional feature of the invention resides broadly in a process which is characterized by the fact that in Variant (b), the charging of the carrier with at least one transition metal oxide or transition metal carbonate is accomplished by applying a decomposable transition metal salt onto the carrier and decomposition of the salt.

A yet additional feature of the invention resides broadly in a process which is characterized by the fact that in Variant (a) or (b), the activation takes place at a temperature which is increased from room temperature to 80° C. to 500° C.

A further additional feature of the invention resides broadly in a process which is characterized by the fact that the activation temperature is increased from room temperature to 180° C. to 450° C.

A yet further additional feature of the invention resides broadly in a process which is characterized by the fact that the activation gas mixture in Variant (a) and (b) includes NO, $NH_3$ and $O_2$ or NO, CO and $O_2$.

Another further additional feature of the invention resides broadly in a which is characterized by the fact that in Variant (b), the ligand capable of forming the complex is at least one of the group NO, CO, $NH_3$, $C_2H_4$, $N_2H_4$ or $H_2NC_2H_4NH_2$.

A yet another additional feature of the invention resides broadly in a process which is characterized by the fact that in Variant (a) or (c), the treatment is conducted in solution containing nitric acid, or nitrate or nitrite ions.

Another yet further feature of the invention resides broadly in use of the catalysts for treatment of exhaust gases containing nitrogen oxide, carbon monoxide and/or organic compounds.

Another embodiment of an invention could be described as a process for the manufacture of a catalyst for treatment of exhaust gases containing volatile compounds, which volatile compounds contain at least one of: oxygen and nitrogen, said catalyst containing at least one transition metal phthalocyanine, said process comprising the steps of:

forming said catalyst;

activating said catalyst by at least one of:

(i) a gas mixture including an activation gas, the activation gas containing at least one of: nitrogen oxide and oxygen;

at a temperature between about room temperature and about 500° C., and;

(ii) a solution which contains at least one of: nitric acid and an oxidation agent;

said catalyst for use in a method of treatment of exhaust gases, the method comprising the following steps:

passing exhaust gases over said catalyst;

reacting the volatile compounds with said catalyst, said volatile compounds containing at least one atom of at least one of oxygen and nitrogen.

Another feature of the invention resides broadly in a method of treatment of exhaust gases containing volatile compounds, which volatile compounds contain at least one of: oxygen and nitrogen, said method being performed with a catalyst containing at least one transition metal phthalocyanine, said method comprising: providing a catalyst comprising at least one transition metal phthalocyanine;

said catalyst being activated by at least one of:

(i) a gas mixture including an activation gas, said activation gas containing at least one of: nitrogen oxide and oxygen, the activating being done at a temperature between about room temperature and about 500° C., and;

(ii) a solution which contains at least one of: nitric acid and an oxidation agent;

said method of treatment of exhaust gases comprising the further following steps:

passing exhaust gases over said catalyst; and reacting the volatile compounds with said catalyst, said volatile compounds containing at least one atom of at least one of oxygen and nitrogen.

Another feature of the invention resides broadly in a method wherein said catalyst comprises: a carrier being charged with a material containing said at least one transition metal phyhalocyanine and wherein said charged carrier is activated with said at least one of:

(i) the gas mixture including the activation gas, said activation gas containing at least one of: nitrogen oxide and oxygen, at a temperature between room temperature and about 500° C., and;

(ii) the solution which contains at least one of: nitric acid and an oxidation agent; and wherein the treatment of exhaust gases comprises the oxidation treatment of exhaust gases.

A further feature of the invention resides broadly in the method of treatment of exhaust gases wherein the catalyst carrier is charged with at least one transition metal oxide in addition to the at least one transition metal phthalocyanine.

A yet further feature of the invention resides broadly in the method of treatment of exhaust gases wherein the transition metal comprises essentially of a member of the group consisting of Cr, Mo, Mn, Fe, Co, Ni and Cu.

Yet another further feature of the invention resides broadly in the method of treatment of exhaust gases wherein the carrier is charged with at least one of:

copper phthalocyanine;
iron phthalocyanine and iron oxide;
manganese phthalocyanine and iron oxide;
manganese oxide;
cobalt oxide; and
copper oxide.

An additional feature of the invention resides broadly in the method of treatment of exhaust gases wherein the carrier material comprises at least one of: aluminum oxide, silicon dioxide, silicate, zeolite and aluminosilicate.

A yet additional feature of the invention resides broadly in the method of treatment of exhaust gases wherein the carrier comprises at least one of: cordierite and a mullite honeycomb structure.

A further additional feature of the invention resides broadly in the method of treatment of exhaust gases wherein the weight of the at least one transition metal phthalocyanine applied to the carrier in relation to the weight of the carrier, is generally about 2 wt. % of the weight of the carrier to about 15 wt. % of the carrier.

A yet further additional feature of the invention resides broadly in the method of treatment of exhaust gases wherein the amount of transition metal oxide is one of: about 0.5 wt. % to about 30 wt. % and about 2 wt. % to about 25 wt. % of the carrier.

Another further additional feature of the invention resides broadly in the method of treatment of exhaust gases wherein the gas mixture, containing the activation gas, contains a quantity of the activation gas in relation to the total volume of the gas mixture in a range of from about 250 ppm to about 5% by volume.

A yet another additional feature of the invention resides broadly in the method of treatment of exhaust gases wherein the oxygen content of said gas mixture is preferably in the range of about 0.1 vol. % to 25 vol. %, and the concentration of NO and any other activation gases is in the range of about 500 ppm to 5000 ppm.

Another yet further feature of the invention resides broadly in the method of treatment of exhaust gases wherein the activation gases are a concentration of approximately 1000 ppm each of NO, CO, and $NH_3$, and approximately 1% to 2% of $O_2$.

A still further feature of the invention resides broadly in the method of treatment of exhaust gases wherein the concentration of nitric acid in the solution is generally between 1 wt. % and 20 wt. %.

A still further additional feature of the invention resides broadly in the method of treatment of exhaust gases wherein the concentration of oxidation agent in the solution is generally between 2 wt. % and 20 wt. %.

Another still further additional feature of the invention resides broadly in the method of treatment of exhaust gases including said solution being applied in the presence of heat in a temperature range between about 20° C. and about 50° C.

Yet another still further additional feature of the invention resides broadly in a catalyst for treatment of exhaust gases containing volatile compounds, which volatile compounds contain at least one of: oxygen and nitrogen, said catalyst containing at least one transition metal phthalocyanine, said catalyst having been activated by at least one of:

(i) a gas mixture including an activation gas, the activation gas containing at least one of: nitrogen oxide and oxygen;

at a temperature between about room temperature and about 500° C., and;

(ii) a solution which contains at least one of: nitric acid and an oxidation agent;

said catalyst for use in a method of treatment of exhaust gases, the method comprising the following steps:

passing exhaust gases over said catalyst;
reacting the volatile compounds with said catalyst, said volatile compounds containing at least one atom of at least one of oxygen and nitrogen.

Federal Republic of Germany Patent item P 39 17 900 may be of interest.

All, or substantially all, of the components and methods of the various embodiments may be used with at least one embodiment or all of the embodiments described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. Catalyst on a carrier support for the removal from exhaust gases of at least one of: nitrogen oxides, carbon monoxide and organic compounds,
   said carrier supported catalyst having been produced by the method of step combination a;
   said method comprising:
   a)
   (a1) charging a carrier with at least one transition metal complex compound, the transition metal complex compound having a substantially planar configuration, and then
   (a2) activating the charged carrier with at least one of:
   (i) a gas mixture which contains at least one of: nitrogen oxide and oxygen, at temperatures between room temperature and 500° C.; and
   (ii) a solution which contains at least one of nitric acid and an oxidation agent;
   and wherein the transition metal compound contains essentially no metal phthalocyanine complex.

2. Catalyst according to claim 1, wherein the carrier is also charged with at least one transition metal oxide before the charged carrier is activated.

3. Catalyst according to claim 2, wherein the transition metal essentially comprises at least one member of the group consisting of: V, Cr, Mo, W, Mn, Fe, Co, Ni and Cu.

4. Catalyst according to claim 3, wherein the carrier comprises at least one of: aluminum oxide, silicon dioxide, and aluminum silicate.

5. Catalyst on a carrier support for the removal from exhaust gases of at least one of: nitrogen oxides, carbon monoxide and organic compounds,
   said carrier supported catalyst having been produced by the method of at least one of: step combination b and step combination c;
   said method comprising:
   b)
   (b1) charging of the carrier with at least one of: a transition metal oxide and transition metal carbonate, and
   (b2) treating the charged carrier with an oxidizing gas mixture, which contains free ligands capable of transition metal complex compound formation, the transition metal complex compound having a substantially planar configuration, said treating being done at temperatures between room temperature and 500° C., and
   c)
   (c1) treating at least one a transition metal oxide and a transition metal carbonate with a solution which contains at least one of: nitric acid, an oxidation agent, and at least one free ligand, said at least one free ligand being capable of transition metal complex compound formation, the transition metal complex compound having a substantially planar configuration; and
   (c2) charging the carrier with at least one of: treated transition metal oxide and treated transition metal carbonate; and
   wherein the transition metal complex compound contains essentially no metal phthalocyanine complex.

6. Catalyst according to claim 5, wherein the transition metal essentially comprises at least one member of the group consisting of: V, Cr, Mo, W, Mn, Fe, Co, Ni and Cu.

7. Catalyst according to claim 6, wherein the carrier comprises at least one of: aluminum oxide, silicon dioxide, and aluminum silicate.

8. Process for the manufacture of a carrier-supported catalyst, the process comprising step combination a;
   said process comprising:
   a)
   (a1) charging a carrier with at least one transition metal complex compound, the transition metal complex compound having a substantially planar configuration, and then
   (a2) activating the charged carrier with at least one of:
   (i) a gas mixture which contains at least one of: nitrogen oxide and oxygen, at temperatures between room temperature and 500° C.; and
   (ii) a solution which contains at least one of nitric acid and an oxidation agent; and
   wherein the transition metal compound contains essentially no metal phthalocyanine complex.

9. Process according to claim 8, wherein the activation by the gas mixture takes place at a temperature which is increased from room temperature to 80° C. and then to 500° C.

10. Process according to claim 9, wherein the activation by the gas mixture takes place at a temperature which is increased from room temperature to 180° C. and then to 450° C.

11. Process according to claim 10, wherein the activation gas mixture comprises one of: a mixture of NO, $NH_3$ and $O_2$; and a mixture of NO, CO and $O_2$.

12. Process according to claim 8, wherein the activating treatment is conducted with a solution containing at least one of: nitric acid, and ions, the ions comprising at least one of: nitrate ions and nitrite ions.

13. Process for the manufacture of a carrier-supported catalyst, the process comprising at least one of: step combination b and step combination c;
   said process comprising:
   b)
   (b1) charging of the carrier with at least one of: a transition metal oxide and transition metal carbonate, and
   (b2) treating the charged carrier with an oxidizing gas mixture, which contains free ligands capable of transition metal complex compound formation, the transition metal complex compound having a substantially planar configuration, said treating being done at temperatures between room temperature and 500° C., and c)
(c1) treating at least one of a transition metal oxide and a transition metal carbonate with a solution which contains at least one of: nitric acid, an oxidation agent, and at least one free ligand, said at least one free ligand being capable of transition metal complex compound formation, the transition metal complex compound having a substantially plane configuration; and (c2) charging the carrier with at least one of: treated transition metal oxide and treated transition metal carbonate; and wherein the transition metal complex compound contains essentially no metal phthalocyanine complex.

14. Process according to claim 13, wherein the step combination (b) comprises the charging of the carrier with at least one of: a transition metal oxide and a transition metal carbonate, by applying a decomposable transition metal salt onto the carrier and then decomposing the salt.

15. Process according to claim 14, wherein, in the step combination (b), the activation treating takes place at a temperature which is increased from room temperature to 80° C. and then to 500° C.

16. Process according to claim 15, wherein, in the step combination (b), the activation treating takes place at a temperature which is increased from room temperature to 180° C. and then to 450° C.

17. Process according to claim 16, wherein, in the step combination (b), the activation treating gas mixture comprises one of: a mixture of NO, $NH_3$ and $O_2$; and a mixture of NO, CO and $O_2$.

18. Process according to claim 13, wherein, in the step combination (c), the activation treating is conducted in a solution containing at least one of: nitric acid, and ions, the ions comprising at least one of: nitrate ions and nitrite ions.

19. Process according to claim 17, wherein in the step combination (b), the ligand capable of forming the transition metal complex compound is at least one of: NO, CO, $NH_3$, $C_2H_4$, $N_2H_4$ and $H_2NC_2H_4NH_2$.

20. Catalyst according to claim 3, wherein the carrier comprises zeolite.

21. Catalyst according to claim 3, wherein the carrier comprises at least one of: a cordierite honeycomb structure and a mullite honeycomb structure.

22. Catalyst according to claim 21, wherein said at least one transition metal complex compound includes at least one member of the group essentially comprising: a transition metal acetylacetate, a transition metal acetate, and a transition metal oxalate.

23. Process according to claim 11, wherein:
said at least one transition metal complex compound includes at least one member of the group essentially comprising: a transition metal acetylacetate, a transition metal acetate, and a transition metal oxalate;
said carrier comprises at least one of: aluminum oxide, silicon dioxide, zeolite, and a cordierite honeycomb structure; and
said transition metal essentially comprises at least one member of the group consisting of: V, Cr, Mo, W, Mn, Fe, Co, Ni, and Cu.

24. Process according to claim 12, wherein:
said at least one transition metal complex compound includes at least one member of the group essentially comprising: a transition metal acetylacetate, a transition metal acetate, and a transition metal oxalate;
said carrier comprises at least one of: aluminum oxide, silicon dioxide, zeolite, and a cordierite honeycomb structure; and
said transition metal essentially comprises at least one member of the group consisting of: V, Cr, Mo, W, Mn, Fe, Co, Ni, and Cu.

25. Catalyst according to claim 6, wherein the carrier comprises zeolite.

26. Catalyst according to claim 6, wherein the carrier comprises at least one of: a cordierite honeycomb structure and a mullite honeycomb structure.

27. Catalyst according to claim 26, wherein in the step combination (b), said ligand capable of forming the transition metal complex compound is at least one of: NO, CO, $NH_3$, $C_2H_4$, $N_2H_4$, and $H_2NC_2H_4NH_2$.

28. Process according to claim 19, wherein:
said carrier comprises at least one of: aluminum oxide, silicon dioxide, zeolite, and a cordierite honeycomb structure; and
said transition metal essentially comprises at least one member of the group consisting of: V, Cr, Mo, W, Mn, Fe, Co, Ni, and Cu.

* * * * *